United States Patent
Kester et al.

(10) Patent No.: US 7,185,015 B2
(45) Date of Patent: Feb. 27, 2007

(54) SYSTEM AND METHOD OF MONITORING AND CONTROLLING APPLICATION FILES

(75) Inventors: Harold M. Kester, Cardiff, CA (US);
Ronald B. Hegli, San Diego, CA (US);
John Ross Dimm, La Jolla, CA (US);
Mark Richard Anderson, Tempe, AZ (US)

(73) Assignee: Websense, Inc., San Diego, CA (US)

( * ) Notice: Subject to any disclaimer, the term of this patent is extended or adjusted under 35 U.S.C. 154(b) by 375 days.

(21) Appl. No.: 10/390,547

(22) Filed: Mar. 14, 2003

(65) Prior Publication Data

US 2004/0181788 A1   Sep. 16, 2004

(51) Int. Cl.
*G06F 7/00* (2006.01)
*G06F 9/44* (2006.01)

(52) U.S. Cl. .................. 707/10; 707/102; 707/104.1; 707/1; 707/100; 717/168; 717/174; 717/120

(58) Field of Classification Search .............. 707/1, 707/6, 9, 10, 100, 102, 104; 713/186, 176; 717/168, 174
See application file for complete search history.

(56) References Cited

U.S. PATENT DOCUMENTS

| | | |
|---|---|---|
| 4,423,414 A | 12/1983 | Bryant et al. |
| 4,941,084 A | 7/1990 | Terada et al. |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,606,668 A | 2/1997 | Shwed |

(Continued)

FOREIGN PATENT DOCUMENTS

EP   0 658 837 A2   12/1994

(Continued)

OTHER PUBLICATIONS

Sandhu, et al., Access Control: Principles and Practice, IEEE Communications Magazine, pp. 40-48, Sep. 1994.

(Continued)

*Primary Examiner*—Jean M. Corrielus
*Assistant Examiner*—Anh Ly
(74) *Attorney, Agent, or Firm*—Knobbe Martens Olson & Bear, LLP

(57) ABSTRACT

A system and method for updating a system that controls applications requested for execution on a workstation. A workstation management module is configured to detect requested execution of an application. A workstation application server receives data associated with the application from the workstation. The application server module can determine one or more categories to associate with the application by referencing an application inventory database or requesting the category from an application database factory. The application database factory can receive applications from multiple application server modules. The application database factory determines whether the application was previously categorized and provides the category to the application server module; which forwards a hash/policy table to the workstation management module. Upon receipt of the hash/policy table, the workstation management module applies the policy to control access to the requested application on the workstation.

36 Claims, 13 Drawing Sheets

U.S. PATENT DOCUMENTS

| | | | |
|---|---|---|---|
| 5,678,041 A | 10/1997 | Baker et al. | |
| 5,682,325 A | 10/1997 | Lightfoot et al. | |
| 5,696,486 A | 12/1997 | Poliquin et al. | |
| 5,696,898 A | 12/1997 | Baker et al. | |
| 5,706,507 A | 1/1998 | Schloss | |
| 5,774,668 A | 6/1998 | Choquier et al. | |
| 5,787,253 A | 7/1998 | McCreery et al. | |
| 5,787,427 A | 7/1998 | Benantar et al. | |
| 5,799,002 A | 8/1998 | Krishnan | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,884,325 A | 3/1999 | Bauer et al. | |
| 5,889,958 A | 3/1999 | Willens | |
| 5,892,905 A | 4/1999 | Brandt et al. | |
| 5,896,502 A | 4/1999 | Shieh et al. | |
| 5,899,995 A * | 5/1999 | Millier et al. | 707/102 |
| 5,911,043 A | 6/1999 | Duffy et al. | |
| 5,941,947 A | 8/1999 | Brown et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A | 11/1999 | Freund | |
| 5,991,807 A | 11/1999 | Schmidt et al. | |
| 5,996,011 A | 11/1999 | Humes | |
| 6,052,723 A | 4/2000 | Ginn | |
| 6,055,564 A | 4/2000 | Phaal | |
| 6,065,059 A | 5/2000 | Shieh et al. | |
| 6,085,241 A | 7/2000 | Otis | |
| 6,105,027 A | 8/2000 | Schneider et al. | |
| 6,154,741 A | 11/2000 | Feldman | |
| 6,182,118 B1 | 1/2001 | Finney et al. | |
| 6,233,618 B1 * | 5/2001 | Shannon | 707/10 |
| 6,295,559 B1 | 9/2001 | Emens et al. | |
| 6,338,088 B1 | 1/2002 | Waters et al. | |
| 6,446,119 B1 | 9/2002 | Olah et al. | |
| 6,456,306 B1 | 9/2002 | Chin et al. | |
| 6,466,940 B1 | 10/2002 | Mills | |
| 6,519,571 B1 | 2/2003 | Guheen et al. | |
| 6,606,659 B1 * | 8/2003 | Hegli et al. | 709/225 |
| 6,741,997 B1 * | 5/2004 | Liu et al. | 707/102 |
| 6,832,230 B1 * | 12/2004 | Zilliacus et al. | 707/203 |
| 6,894,991 B2 | 5/2005 | Ayyagari et al. | |
| 6,947,935 B1 * | 9/2005 | Horvitz et al. | 707/7 |
| 6,947,985 B2 * | 9/2005 | Hegli et al. | 709/224 |
| 6,978,292 B1 | 12/2005 | Murakami et al. | |
| 2001/0032258 A1 | 10/2001 | Ishida et al. | |
| 2001/0039582 A1 | 11/2001 | McKinnon et al. | |
| 2002/0073089 A1 * | 6/2002 | Schwartz et al. | 707/10 |
| 2002/0129039 A1 * | 9/2002 | Majewski et al. | 707/200 |
| 2002/0133509 A1 * | 9/2002 | Johnston et al. | 707/203 |
| 2002/0152284 A1 | 10/2002 | Cambray et al. | |
| 2003/0005112 A1 | 1/2003 | Krautkremer | |
| 2003/0023860 A1 * | 1/2003 | Eatough et al. | 713/189 |
| 2003/0074567 A1 * | 4/2003 | Charbonneau | 713/186 |
| 2003/0126136 A1 * | 7/2003 | Omoigui | 707/10 |
| 2003/0126139 A1 * | 7/2003 | Lee et al. | 707/100 |
| 2003/0177187 A1 * | 9/2003 | Levine et al. | 709/205 |
| 2004/0019656 A1 * | 1/2004 | Smith et al. | 709/217 |
| 2004/0068479 A1 * | 4/2004 | Wolfson et al. | 707/1 |
| 2004/0078591 A1 | 4/2004 | Teixeira et al. | |
| 2004/0111499 A1 * | 6/2004 | Dobrowski et al. | 709/222 |
| 2004/0220924 A1 * | 11/2004 | Wootton | 707/3 |
| 2005/0155012 A1 * | 7/2005 | Tayama et al. | 717/101 |

FOREIGN PATENT DOCUMENTS

| | | |
|---|---|---|
| EP | 0 748 095 A2 | 12/1996 |
| WO | WO 92/19054 | 10/1992 |
| WO | WO 96/42041 | 12/1996 |
| WO | WO 01/33371 | 5/2001 |
| WO | WO 01/55873 | 8/2001 |
| WO | WO 01/55905 | 8/2001 |
| WO | WO 01/63835 | 8/2001 |

OTHER PUBLICATIONS

C. L. Schuba and E. H. Spafford. Countering abuse of name-based authentication. In 22nd Annual Telecommunications Policy Research Conference, 21 pp. 1996.

SurfControl plc, SuperScout Web Filter Reviewer's Guide, 36 pp. 2002.

Yialelis, et al., Role-Based Security for Distributed Oject Systems, Proceedings of the IEEE Fifty Workshops on Enabling Technology: Infrastructure for Collaborative Enterprises (WET ICE '96), 6 pp., Jun. 19-21, 1996.

Supplementary European Search Report for EPO App. No. 00 90 7078, mailed May 18, 2004.

Roberts-Witt, S., The 1999 Utility Guide: Corporate Filtering, PC Magazine Online, Apr. 5, 1999, pp. 1-11.

Sequel Technology, Inc., Sequel and Surfwatch Partner to Provide Innovative Internet Resource Management Tools for Large Enterprises, Internet, Online!, Feb. 25, 1999, pp. 1-3.

SurfWatch Software, SurfWatch® Professional Edition: Product Overview, Internet, Online!, May 26, 1999, p. 1.

Newman, H., A Look at Some Popular Filtering Systems, Internet, Online!, Jul. 25, 1999, pp. 1-11.

Secure Computing Corporation, SmartFilter™ Web Tool, Dec. 1, 1998, pp. 1-2.

European Search Report for Application No. 02258462.7, mailed Jan. 30, 2006.

PCT Search Report for Application No. PCT/US2006/018823, mailed Sep. 25, 2006.

* cited by examiner

| Parent group | Category | Security VC | Liability VC | Produc'ty VC |
|---|---|---|---|---|
| System | | | | |
| | Operating Systems | | | |
| | Device Drivers | | | |
| | File Management | | | |
| | Installers | | | |
| | Miscellaneous Utilities | | | |
| Access/Privacy | | | | |
| | Anti-virus Software | | | |
| | Authentication | | | |
| | Encryption | | | |
| | Firewalls | | | |
| | Hacking | X | X | |
| | Remote Access | | | |
| | Spyware | X | | |
| | System Audit | | | |
| Productivity | | | | |
| | Contact Managers | | | |
| | CRM | | | |
| | Data Warehousing, Analytics, Reporting | | | |
| | Database | | | |
| | Document Viewers | | | |
| | ERP/SCM | | | |
| | Graphics | | | |
| | Infrastructure | | | |
| | Presentation | | | |
| | Project Managers | | | |
| | Proprietary | | | |
| | Reference | | | |
| | Search/Retrieval/Knowledge Management | | | |
| | Software Development | | | |
| | Spreadsheets | | | |
| | Suite/integrated | | | |
| | Web/Desktop Publishing | | | |
| | Word Processing | | | |
| Communication | | | | |
| | Collaboration | | | |
| | Dedicated Browsers | | | X |
| | Email | | | |
| | Instant Messaging | | | |
| | P2P Filesharing | | X | |
| | Telephony/Conference/Fax | | | |
| | Web Browsers | | | |
| Audio/Video | | | | |
| | Media Players | | | X |
| | Imaging | | | X |
| Entertainment | | | | |
| | Adult | | X | |
| | Gambling | | X | |
| | Games | | | X |
| Malware | | | | |
| | Malicious Applets and Scripts | X | | |

*FIG. 4*

SYSTEM AND METHOD OF MONITORING AND CONTROLLING APPLICATION FILES

BACKGROUND OF THE INVENTION

1. Field of the Invention

The invention is related to computing devices and, more particularly to monitoring and controlling application files operating thereon.

2. Description of the Related Art

The Internet is a global system of computers that are linked together so that the various computers can communicate seamlessly with one another. Employees can access server computers to download and execute rogue programs and also operate peer-to-peer file sharing in the workplace, both of which pose new threats to an employer. For example, instant messaging (IM) can pose a security risk to an employer's company since many IM system allow file transfer among computers. Because the employees can activate IM themselves, the employer does not know who sees sensitive data transmitted between the computers. However, IM can be a productive tool, when used in accordance with company policy. In addition, streaming media is a growing concern because of its drain on network bandwidth. Finally, employees that have illegal or unlicensed software on their workstations can present undesirable liability risks to the company because the company can be held responsible for the employee's use of the illegal or unlicensed software.

Software is available to manage how employees access the Internet in the workplace, preserving employee productivity, conserving network bandwidth and storage costs, limiting legal liabilities and improving network security. However, with the growth of the new threats described above which extend beyond the Internet web browser, employers need new solutions to manage the broader intersection of employees with their computing environments.

SUMMARY OF THE INVENTION

The systems and methods of the invention have several features, no single one of which is solely responsible for its desirable attributes. Without limiting the scope of the invention as expressed by the claims which follow, its more prominent features will now be discussed briefly. After considering this discussion, and particularly after reading the section entitled "Detailed Description of the Invention" one will understand how the features of the system and methods provide several advantages over traditional filter systems.

One aspect is a system for collecting program data for use in updating a monitoring system which controls programs operating on a workstation. The system comprises a workstation having a database of categorized application programs along with one or more policies associated with each program, the workstation being configured for a user to request execution of a program. The system further comprises a workstation management module coupled to the workstation and configured to detect the program requested by the user, determine whether the program is in the categorized application database, send the program and program data associated with the program to an application server module if the program is not in the categorized application database, and apply one or more policies that are associated with the program, wherein the one or more policies are received from the application server module. The system further comprises an application server module coupled to the workstation and configured to receive the program data from the workstation management module if the program was not in the categorized application database at the workstation management module, determine whether the program was previously categorized at the application server module, if the program was not previously categorized at the application server module, then send the program data to an application database factory. Alternatively, if the program was previously categorized at the application server module, then the system provides the one or more policies associated with one or more categories that were previously associated with the program to the workstation management module.

Another aspect of the invention is a method of updating a system which controls operation of programs on a workstation. The method comprises detecting a launch of an application on the workstation, generating an application digest for the launched application, determining whether the application is categorized, wherein a categorized application is associated with one or more policies, and if the application is categorized, then applying the one or more policies that are associated with the application. Alternatively, if the application is not categorized, then the method further comprises posting the application to a logging database, uploading the logging database to an application server module, and determining whether the application is in an application inventory database of categorized applications, wherein a categorized application is associated with one or more categories. If the application is not in the application inventory database of the application server module, then the method further comprises posting the application to an uncategorized application database. Alternatively, if the application is in the application inventory database, the method further comprises applying one or more policies associated with the application.

Still another aspect of the invention is a method of updating a system which controls operation of programs on a workstation. The method comprises detecting a launch of an application on the workstation, generating a hash value for the launched application, comparing the generated hash value to one or more hash values in a hash/policy table that includes one or more policies associated with the one or more hash values, and if the generated hash value matches one or more of the hash values in the hash/policy table, then applying the one or more policies that are associated with the one or more hash values. Alternatively, if the generated hash value does not match one or more hash values in the hash/policy table, then the method comprises posting the application to a logging database, uploading the logging database to an application server module, and determining whether the application from the logging database is in an application inventory database. If the application is not in the application inventory database, then the method comprises posting the application to an uncategorized application database.

Yet another aspect of the invention is a method of collecting collection data for use in updating a system which controls execution of programs on a workstation. The method comprises launching a program at the workstation, determining whether the program is stored in a table, and if the program is stored, applying a first rule that is associated with the program. Alternatively, if the program is not stored, the method further comprises posting the program to a database.

BRIEF DESCRIPTION OF THE DRAWINGS

FIG. 4 is an illustration of a database of parent groups and categories that can be associated with an application file.

DETAILED DESCRIPTION OF THE INVENTION

The following detailed description is directed to certain specific embodiments of the invention. However, the invention can be embodied in a multitude of different systems and methods. In this description, reference is made to the drawings wherein like parts are designated with like numerals throughout.

In connection with the following description, many of the components of the various systems which may be included in the entire system, some of which are referred to as modules, can be implemented as software, firmware or a hardware component, such as a field programmable gate array (FPGA) or application specific integrated circuit (ASIC), which performs certain tasks. Such components or modules may be advantageously configured to reside on the addressable storage medium and configured to execute on one or more processors. Thus, a module may include, by way of example, components such as software components, object oriented software components, class components and task components, processes, functions, attributes, procedures, subroutines, segments of program code, drivers, firmware, microcode, circuitry, data, databases, data structures, tables, arrays and variables. The functionality provided for in the components and modules may be combined into fewer components and modules or further separated into additional components and modules. Additionally, the components and modules may advantageously be implemented to execute on one or more computers.

Figure 1:
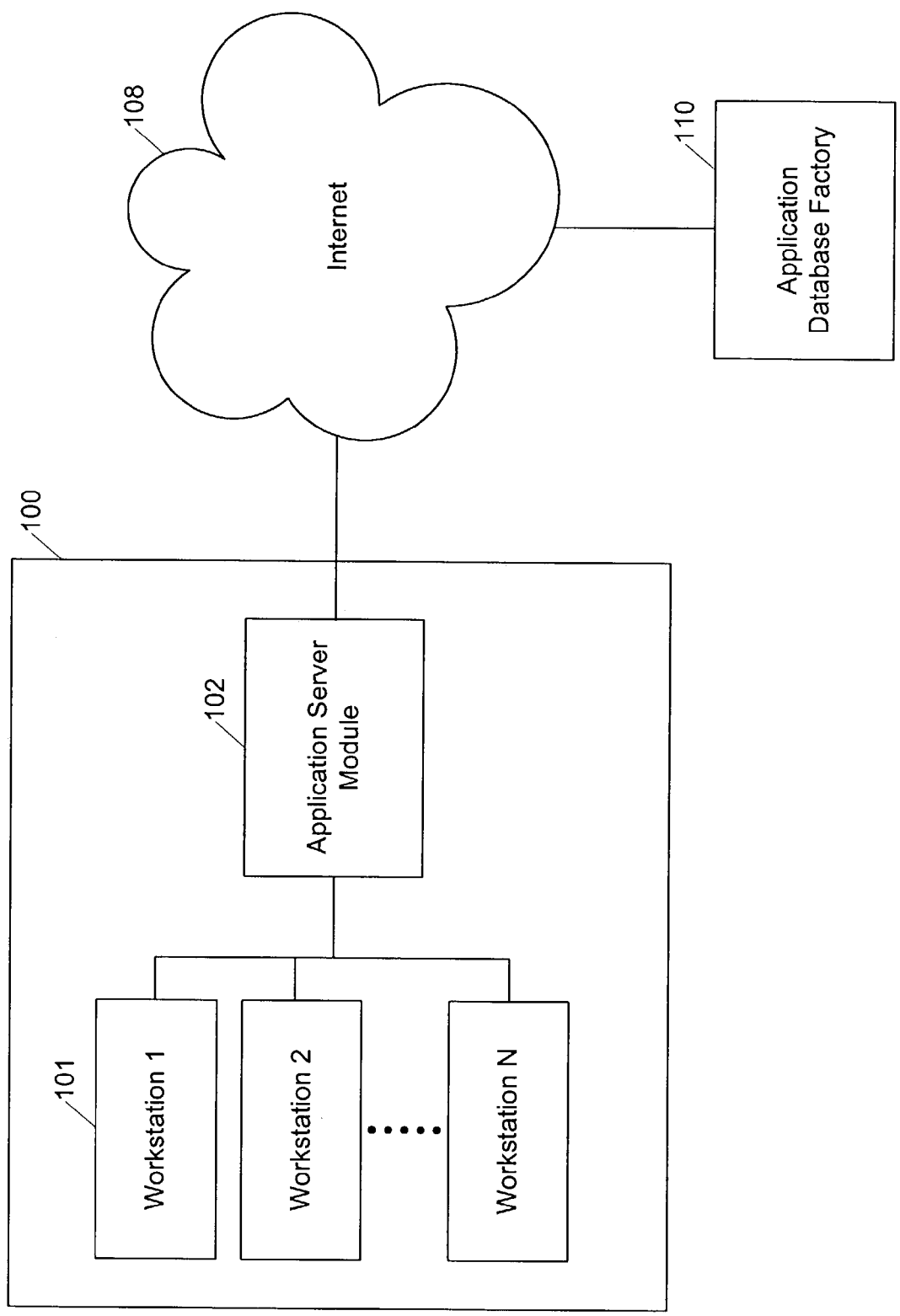
FIG. 1 is a block diagram of a site collection system for controlling application files on a workstation.

FIG. 1 is a block diagram of a local area network (LAN) 100 coupled to an Internet 108 and an application database factory 110, which is also coupled to the Internet 108. For ease of explanation, only a single LAN is shown, though two or numerous such networks would more typically be included. Similarly, two or more application database factories could also be deployed.

The LAN 100 includes one or more workstations 101 coupled to an application server module 102. The application server module 102 communicates via the Internet 108 in order to upload and download applications and application related data with the application database factory 110. The LAN 100 can have an Ethernet 10-base T topology, or be based on any networking protocol, including wireless networks, token ring network and the like.

The workstation 101 is coupled to the application server module 102. The workstation 101 can be a personal computer operating, for example, under the Microsoft Windows operating system, however, other computers, such as those manufactured by Apple or other systems, can be used.

The application server module 102 couples the LAN 100 with the Internet 108. The application server module 102 communicates with the Internet 108 via connection devices, such as routers or other data packet switching technology, for translating Internet TCP/IP protocols into the proper protocols for communicating with the Internet 108. The connection devices used to implement a given system can vary as well as its location within the LAN 100. For example, the connection devices could be located at the workstation(s) 101 or connected peripherally to the Internet 108. An exemplary connection device includes a firewall module (not shown) coupled to a router module (not shown).

Figure 2:
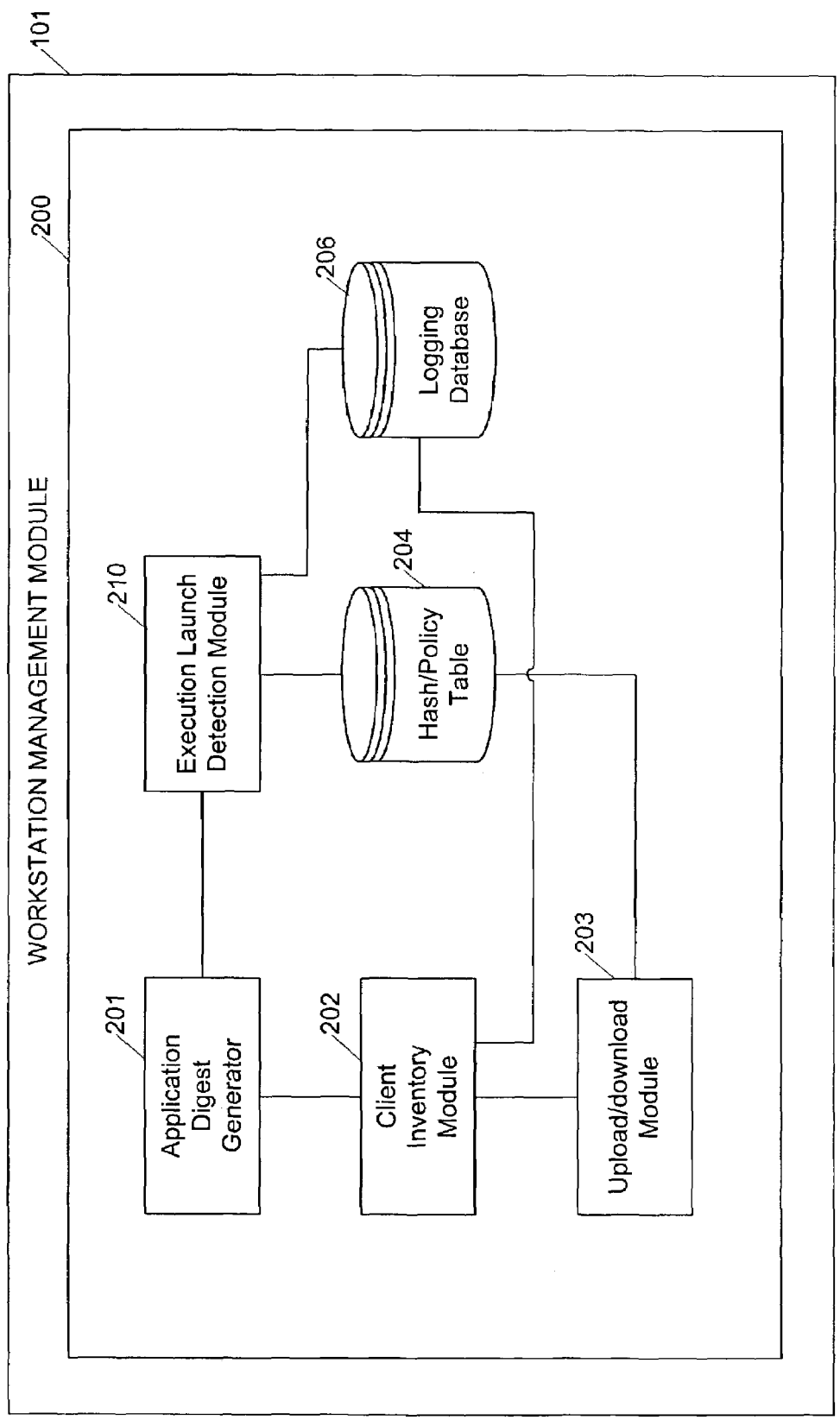
FIG. 2 is a block diagram of a work station management module.

FIG. 2 is a block diagram of the workstation management module 101 from FIG. 1. The workstation management module 101 can detect the launch of an application on the workstation 101 and determine an access privilege for the workstation 101 and/or user. For example, an access privilege can include allowing the launched application to run on the workstation 101. Access privileges can be in the form of one or more policies or rules. To determine the access privilege for the workstation 101 and/or user, the workstation management module 101 can utilize a predetermined association between the launched application and one or more categories. The one or more categories can be further associated with the policies or rules for the workstation 101 and/or user.

The workstation management module can include an application digest generator 201, a client inventory module 202, an upload/download module 203, a hash/policy table 204, a logging database 206, and an execution launch detection module 210.

When a program on a computer or workstation is launched, the execution launch detection module 210 detects the launch and directs the application digest generator 201 to analyze data related to the requested application. As part of its analysis, the execution launch detection module 210 can generate a hash for the application using the application digest generator 201. The application digest generator 201 parses properties from the requested application. Examples of such properties include the name, publisher, suite, hash, file size, version, and additional information or properties which are associated with the launched application.

The hash for the launched application is determined by transforming the binary associated with the launched application into a unique set of bits. A hash function, which is a form of encryption known in the art, is employed in determining the hash for the launched application. In this way, the hash function takes selected binary input from the application and transforms the binary into a fixed-length encrypted output called a hash. The result is a hash with a fixed-size set of bits that serves as a unique "digital fingerprint" for the launched application. Two exemplary hash algorithms include MD-5 and Secure Hash Algorithm-1 (SHA-1). The MD-5 hash algorithm produces a 128-bit output hash. The SHA-1 algorithm produces a 160-bit output hash.

The parsed properties and/or application associated with the parsed properties are provided to the execution launch detection module 210. The execution launch detection module 210 analyzes the application request from the workstation 101 and then compares the application request with the hash/policy table 204. The hash/policy table 204 includes one or more predetermined parsed properties and one or more policies associated therewith. As will be explained with reference to FIG. 3, the application server module 102 provides the hash/policy table 204 to the workstation management module 200.

The hash/policy table 204, which is received from the application server module 102, can include a list of application names, publishers, suites, hashes, categories, and rules or policies associated therewith. In one embodiment, the one or more parsed properties in the hash/policy table 204 include a list of hash values. Continuing with this embodiment, the hash/policy table 204 further includes a list of policies that are associated with the hash values in the list. In addition to hash values and policies in this embodiment, the hash/policy table 204 could further include a list of categories that are associated with the hash values and/or policies. Moreover, in another embodiment, the hash/policy table 204 does not include hash values. Instead, the hash/policy table 204 includes the names/publishers/suites or other properties which identify the applications in the hash/policy table 204.

Once the application that is being requested to run on the workstation is identified, the policy from the hash/policy table 204 which corresponds to that application is also identified. The execution launch detection module 210 compares the properties of the application to the properties in the hash/policy table 204 to determine what access privileges or policies should be applied to the request to run the application. These policies or rules can include, for example, allowing the execution of the program, denying execution of the program, alerting the user that the request to run the application will be logged, and allowing the user a specific amount of time in which to run the application.

In addition to the policies and rules listed above, the workstation management module 200 can employ other actions, cumulatively referred to as selectable filters, in response to a request to run the application. Examples of selectable filters include postponing the running of the application, allowing the user to override denial to run the application, limiting the user's access to the application based on a quota, and limiting the user's access to the application based on a network load. Each requested application can be associated with one or more policies or rules.

In one embodiment, the execution launch module 210 checks to see if the generated hash matches any hashes stored in the hash/policy table 204. If a match between the requested application and a hash in the hash/policy table 204 is found, the execution launch detection module 210 applies the policy(s)/rule(s) associated with the hash that matches the requested application and/or the user requesting the application. For example, if application of the rule by the execution launch detection module 210 indicates that the requested application is not allowed to run on the workstation 101 or to be run by the user, a predefined block page can be sent to the user interface explaining that the requested application is not allowed to run and why. Alternatively, the execution launch detection module 210 simply stops the requested application from running on the workstation 101.

If the execution launch detection module 210 does not find the application hash in the hash/policy table 204 (for example, the application is uncategorized), the execution launch detection module 210 then determines how to proceed with the uncategorized application. For example, running of the application could be allowed when the execution launch detection module 210 determines that the application requested is uncategorized. Alternatively, the execution launch detection module 210 can stop execution of the requested application depending on policy for this user at this workstation.

The one or more policies identified for the requested application is applied in response to the request to run the application. In this way, the execution launch detection module 210 filters each request to run an application using the parsed properties, the hash/policy table 204, and the policies/rules from the hash/policy table. A policy can be provided and utilized even if the application is not found in the hash/policy table 204.

If the requested application is found in the hash/policy table 204, the event is logged in the logging database 206. Information that is logged in the logging database 206 can include, for example, the application name, time of day, and the hash associated with the application. The logging database 206 can also include additional data associated with the application requested. For example, a request frequency or a time of execution for the application requested can be included in the logging database 206.

If the hash of the uncategorized application is not represented in the logging database 206, the execution launch detection module 210 can store the application name, hash, and information parsed by the application digest generator 201 in the logging database 206. In this way, the logging database 206 can include additional information associated with the requested application. For example, the publisher, suite, file size, hash, and directory location can be included in the logging database 206.

Still referring to FIG. 2, in one embodiment, the client inventory module 202 is configured to inventory the applications on the workstation 101. To that end, the client inventory module 202 can access the hash/policy table 204 to determine whether the applications on the workstation 101 are classified and/or uncategorized. The client inventory module 202 can be configured to perform the inventory of the workstation 101 on a periodic basis. For example, the client inventory module 202 can inventory the applications on the workstation 101 once a day or on any other interval selected. Advantageously, the client inventory module 202 can perform the inventory during non-working hours. The inventory can be determined when the workstation 101 is powered up by the user or powered down by the user. Depending on the configuration of the LAN 100, a network administrator can instruct the client inventory module 202 to perform the inventory. In addition, the inventory can be performed in response to polling by the application server module 102 (see FIG. 1).

Still referring to FIG. 2, the upload/download module 203 can transmit data to and receive data from the application server module 102 (see FIG. 1). For example, the upload/download module 203 can transmit data from the logging database 206 to the application server module 102. In an embodiment where the client inventory module 202 performs an inventory of the applications on the workstation 101, the results of the inventory can be uploaded to the application server module 102 by the upload/download module 203.

The upload performed by the upload/download module 203 can be immediate or periodic depending on the desires of the network administrator. For example, a daily upload after normal business hours could be used. The upload/download module 203 can compute the request frequency from scanning the logging database 206, to prioritize the applications in the logging database 206 for their transmission to the application server module 102. In another embodiment, a frequency count database (not shown) is updated for each entry in the logging database 206. The frequency count database maintains the request frequency for each entry in the logging database 206. In this embodiment, the upload/download module 203 accesses the frequency count database to prioritize the applications.

If data from the logging database 206 is to be uploaded to the application server module 102, the upload/download module 203 can refer to a request frequency for applications found from scanning the logging database 206. The request frequency can be used to prioritize the applications in the logging database 206 for their transmission to the application server module 102.

Figure 3:
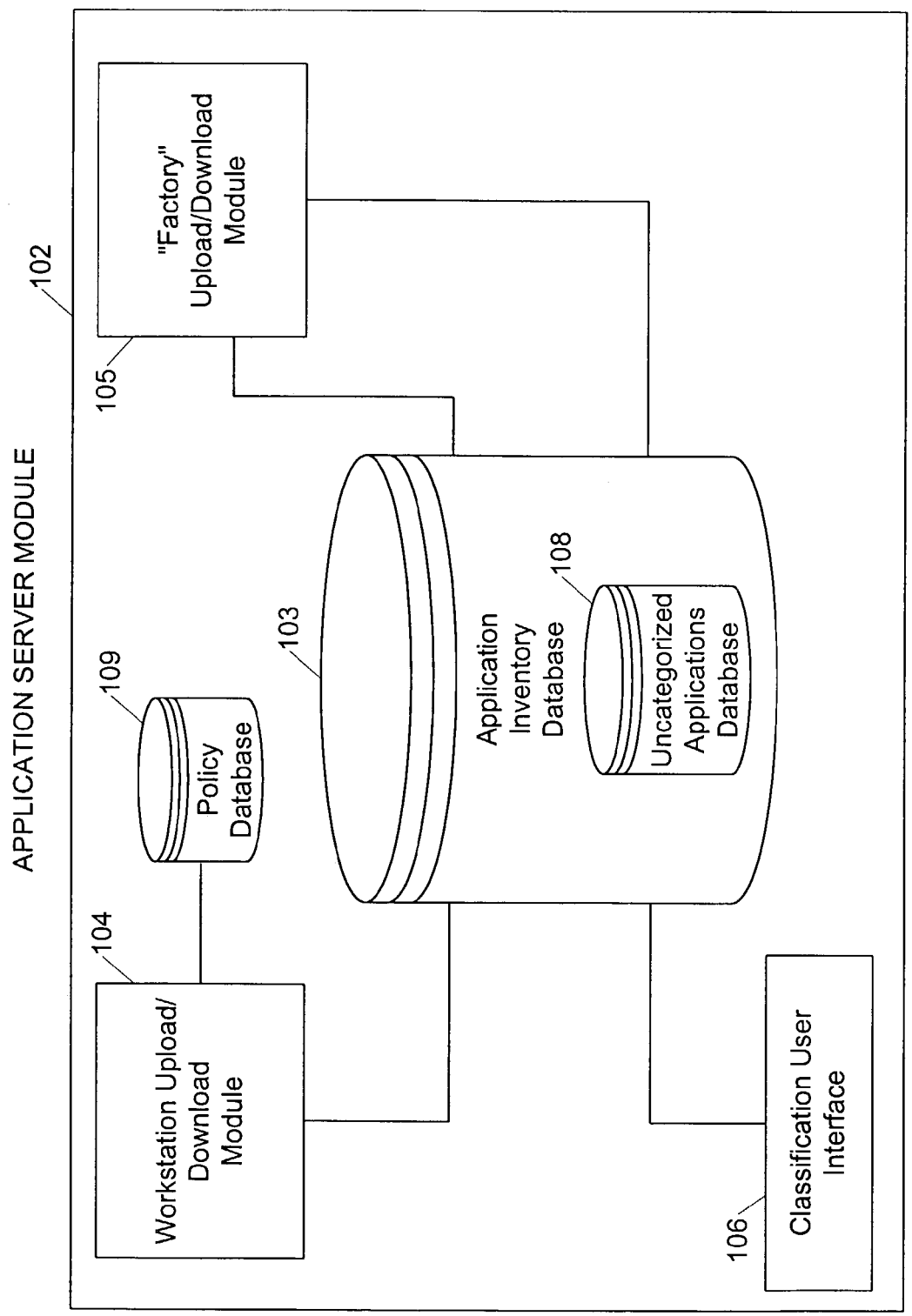
FIG. 3 is a block diagram of an application server module.

FIG. 3 is a block diagram of an application server module 102 which communicates with the workstation management module 200 (FIG. 2) to upload and download a list of applications comprising properties of applications as well as policies associated with the applications once categorized. For example, parsed properties from requested applications can be uploaded to the application server module 102 while a list of hash values and policies associated therewith are downloaded to the workstation management module 200. In addition, the category associated with the application can be transmitted to the workstation management module 200. If the category associated with the application is available to the workstation management module 200, the workstation management module can select the access privilege for the workstation and/or user that corresponds to the one or more categories associated with the application. When more than one category is associated with the application and the categories have different policies associated thereto, one or both rules/policies can be used for the access privilege.

The application server module 102 can include an application inventory database 103, a workstation upload/download module 104, a factory upload/download module 105, a classification user interface 106, and a policy database 109. The application inventory database 103 can further include an uncategorized application database 108. Alternatively, the uncategorized application database 108 can be a separate database from the application inventory database 103.

The network administrator, or the like, interfaces with the application server module 102 via the classification user interface 106. The network administrator can classify uncategorized applications from the application inventory database 103 via the classification user interface 106. The network administrator can further interface through the classification user interface 106 to select or create access privileges/policies/rules for users, workstation, and/or groups of users/workstations. These rules are stored in the policy database 109. These rules can include, for example, allowing applications associated with selected categories to execute on a given workstation 101. Rules can also include selectable filters. For example, rather than simply not allowing the application to execute, the network administrator may select or create a selectable filter which is applied when the application is requested. The rules are provided to the workstation management module 200 via the workstation upload/download module 104. In this way, the execution launch detection module 210 (see FIG. 2) applies the rule that is associated with the category of the requested application.

One function of the workstation upload/download module 104 is to receive identifiers for the application names and any additional data or parsed properties which are associated with the application names from the workstation management module 200. For example, the identifier for an application name could be a hash value or the name of the application itself. In one embodiment, the application names include names from the logging database 206. The additional data can also include a request frequency for an application found in the logging database 206, the request frequency for an application found in the logging database 206, a trace ID, and a primary language used by the workstation management module 200. For ease of explanation, the term "collection data" will be used to include applications and any additional data associated with the application. Additionally, the workstation upload/download module 104 downloads all or portions of the application inventory database 103 to the workstation management module 200 as will be described more fully below.

The workstation upload/download module 104 receives the collection data from the upload/download module 203 (see FIG. 2) and processes the collection data. Processing can include merging and sorting the collection data from multiple workstation management modules. The workstation upload/download module 104 determines whether each application in the collection data requires categorization. If an application has not been previously categorized, the collection data associated with that application is stored in the uncategorized application database 108. The network administrator can receive the collection data (for example, application information and any additional data associated with the application) from the uncategorized application database 108. The network administrator, via the classification user interface 106, is then able to categorize the uncategorized application and/or associate a policy with the category or application. Once categorized, the application is stored in the application inventory database 103. As will be described below, if the network administrator does not classify the application, the application database factory 110 can classify the collection data.

Once the application has been classified or categorized by the network administrator, the application and the associated category are posted to the application inventory database 103. The workstation upload/download module 104 thereafter routinely copies the application inventory database 103 or a portion thereof to the workstation management module 200 (see FIG. 2). For example, data from the application inventory database 103 can be copied to the hash/policy table 204. The policies in the policy database 109 can be incorporated into the downloaded data from the application inventory database 103 or downloaded separately from the application inventory database 103. As can be imagined, the system can include thousands of workstation management modules 200, each of which is updated regularly by the workstation upload/download module 104 to provide updated data to the hash/policy table 204. In some embodiments, the workstation upload/download module 104 transfers portions of the application inventory database 103. For example, the workstation management module 200 can receive updates so that the entire database need not be transmitted. In other embodiments, the workstation management module 104 receives a subset of the data from the application inventory database 103. For example, the selected data could be the hash values. The policies from the policy database 109 could then be incorporated with the hash values and downloaded to the workstation management module 104. A flowchart of the process performed by the application server module 102 is shown in, and will be described with reference to, FIG. 9.

Still with reference to FIG. 3, the factory upload/download module 105 is configured to transmit data from the application inventory database 103 to the application database factory 110. The upload could be immediate or periodic depending on the level of service required by the network administrator. For example, a daily upload after normal business hours could be used. The factory upload/download module 105 can refer to the request frequency to prioritize the applications in the application inventory database 103 for their transmission to the application database factory 110. The factory upload/download module 105 can refer to the uncategorized application database 108 to select collection data for uploading to the application database factory 110. If data from the uncategorized application database 108 is to be uploaded to the application database factory 110, the factory upload/download module 105 can refer to a request frequency to select applications from the uncategorized application database 108 for uploading to the application database factory 110. In this way, the request frequency can be used to prioritize the applications in the uncategorized application database 108 for their transmission to the application database factory 110.

The factory upload/download module 105 can further upload applications that have been classified by the network administrator. As described above, the network administration can classify or categorize applications via the classification user interface 106. In this way, the application database factory 110 receives the newly classified applications from the application server module 102. As can be imagined, the application database factory 110 can receive applications and associated categories from thousands of application server modules 102.

The workstation upload/download module 104 can receive an inventory taken by the client inventory module 202 from the upload/download module 203 (see FIG. 2). Once uploaded to the application server module 102, the network administrator can review one or more inventories to determine what applications are being used by each workstation 101. The inventory can include categorized as well as uncategorized applications. Depending on the configuration of the LAN 100, the network administrator can review the one or more inventories at the workstation management module 200 (see FIG. 2).

FIG. 4 is an illustration of one embodiment of a database of parent groups and categories that are associated with the applications. In the illustrated embodiment, one or more of the categories listed in the database are further associated with risk classes. Examples of risk classes include security, liability, and productivity. The risk classes can be useful to the network administrator when associating rules/policies with each application. Moreover, in some embodiments each rule/policy is associated with the applications based on the risk class that is associated with each category.

Still referring to FIG. 4, exemplary categories of applications include operating systems, anti-virus software, contact managers, collaboration, media players, adult, and malicious applets and scripts. The categories can be further grouped into parent groups. For example, parent groups might include system, access/privacy, productivity, communication, audio/video, entertainment, and malware. For each one of the parent groups and/or categories, the network administrator can select an individual policy or rule to associate therewith. Thus, once the requested application is categorized, the application server module 102 can select the policy or rule that is associated with that category.

Figure 5:
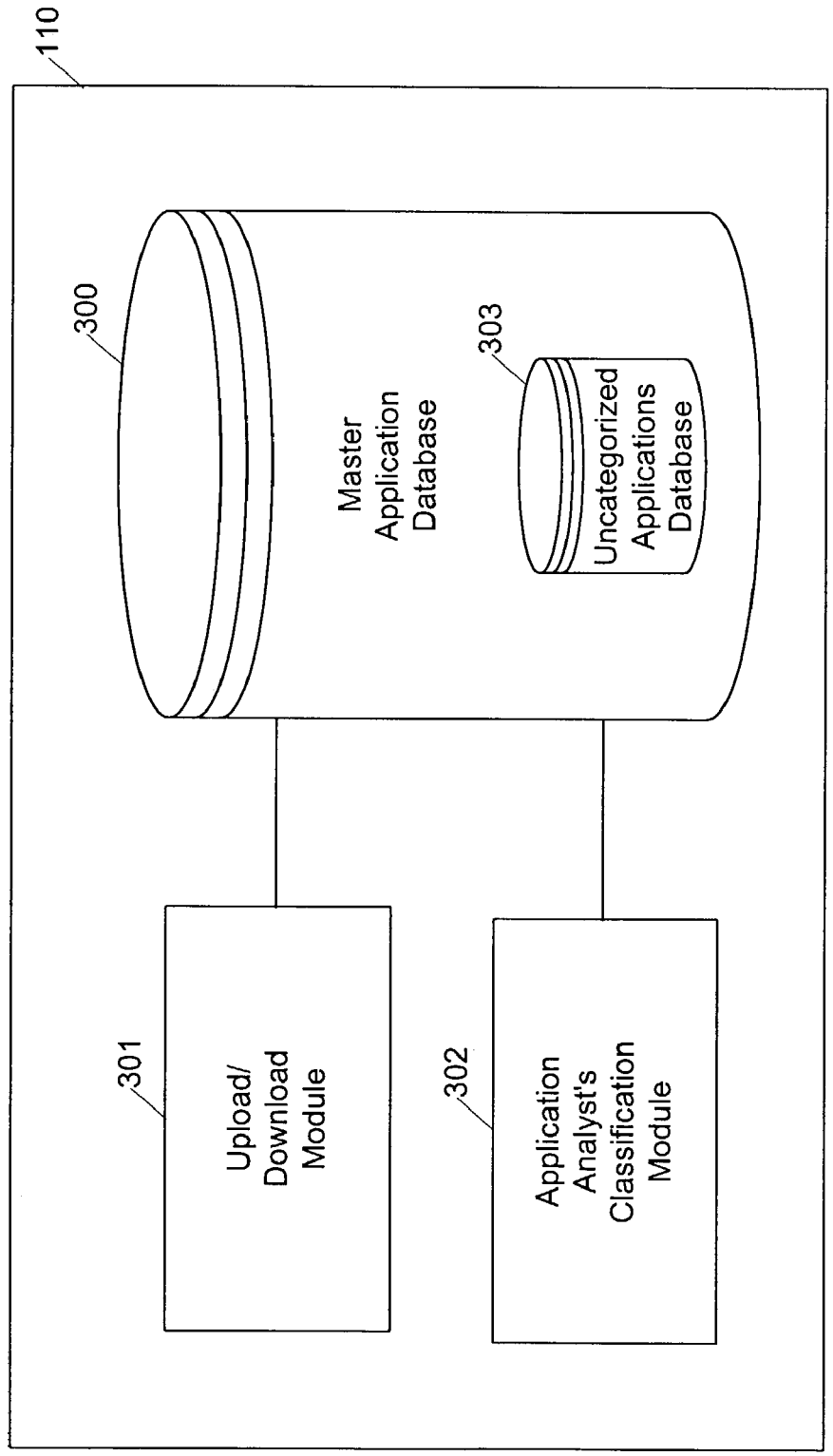
FIG. 5 is a block diagram of an application database factory.

FIG. 5 is a block diagram of the application database factory 110 connected to the Internet 108. The application database factory can be implemented as one or more computers or servers with related data storage. The application database factory 110 provides the application inventory database to the application server module 102 and processes data that is associated with uncategorized applications and other information. For example, frequency usage from the application inventory database 103 can be processed. In one embodiment, the application database factory 110 receives uncategorized applications and any additional data associated with the application from the application server module 102 and downloads categorized applications to the application server module. The application database factory 110 can also upload the request frequency for the applications.

The application database factory 110 can include an upload/download module 301, a master application database 300, and an application analyst's classification module 302. The master application database 300 can further include an uncategorized applications database 303.

One function of the upload/download module 301 is to receive collection data (for example, applications and any additional data associated with the application) from the application server module 102. In one embodiment, the collection data includes applications from the uncategorized application database 108 and applications from the application inventory database 103. The collection data can include a request frequency for an application found in the application inventory database 103 (see FIG. 3), a request frequency for an application found in the uncategorized application database 108, a trace ID, and a primary language used by the application server module 102.

The upload/download module 301 receives the collection data from the factory upload/download module 105. The upload/download module 301 processes the collection data. Processing can include merging, sorting, and determining a language for the collection data from multiple application server modules 102. The upload/download module 301 determines whether each application in the collection data requires categorization. If the application has not been previously categorized, the application analyst's classification module 302 receives the application and any additional data associated with the application from the upload/download module 301.

The application analyst classification module 302 is coupled to the master application database 300. The application analyst classification module 302 is configured to manipulate and manage data from the master application database 300. The application analyst classification module 302 receives applications and their associated data from the master application database 300. The associated data can include, for example, a publisher and suite that correspond to the application.

The application analyst's classification module 302 classifies or categorizes applications which are then added to the master application database 300 of categorized applications. A human reviewer interacts with the application analyst's classification module 302 to perform the categorization or recategorization. The process for classifying or categorizing applications at the application database factory is described with reference to FIG. 13.

For a human reviewer, a set of PC-based software tools can enable the human reviewer to manipulate, scrutinize, and otherwise manage the applications from the master application database 300. The human reviewer can interact with the application analyst classification module 302 via a graphical user interface (GUI). In this way, the GUI provides a graphical interface tool for the human reviewer to manipulate and manage the master application database 300. The GUI includes a representation of the application ID and the related textual information. The GUI can include buttons preloaded with algorithmically derived hints to enhance productivity of the human reviewer. These identities can be selected based on, for example, the URL that is identified as the source of the application. An exemplary GUI will be described below with reference to FIG. 6.

The application analyst's classification module 302 is configured to select applications and their associated data from the master application database 300. The application analyst classification module 302 can apply rules to select a subset of applications from the master application database 300. These rules can be dependent upon, for example, categories, languages, suites, dates, and source directories. The application analyst classification module 302 can use SQL queries, in conjunction with the rules, to select the subset for categorization or recategorization from the master application database 300.

The application analyst classification module 302 can analyze each application, the collection data, any text objects associated with the application, any additional data associated with the application, and any additional data retrieved independent of the collection data to determine one or more appropriate categories. Exemplary independent data includes data from an Internet search that utilizes the collection data. Categorization can be based upon word analysis, adaptive learning systems, and image analysis.

In one embodiment, the application analyst classification module 302 accesses the Internet 108 and performs a search based on the application and the collection data. In one embodiment, a GUI button preloaded with the publisher of the application is selected by the human reviewer to initiate an Internet search. The Internet search can provide the application analyst's classification module 302 with additional information to the application analyst classification module 302 for categorizing the application. For example, the search can identify a uniform resource locator (URL) which is the address of a computer or a document on the Internet that is relevant to the categorization process for the application. The URL consists of a communications protocol followed by a colon and two slashes (e.g.,: http://), the identifier of a computer, and usually a path through a directory to a file. The identifier of the computer can be in the form of a domain name, for example, www.m-w.com, or an Internet protocol (I.P.) address, for example, 123.456.789.1. There are often addresses, components thereof (for example, I.P. address, domain name, and communication protocol), or other location identifiers can be used to identify computers or documents on the Internet, for ease of description, the term URL is used hereafter. The application analyst's classification module 302 can utilize the hash and/or URL associated with the application to aid in categorizing the application.

Figure 13:
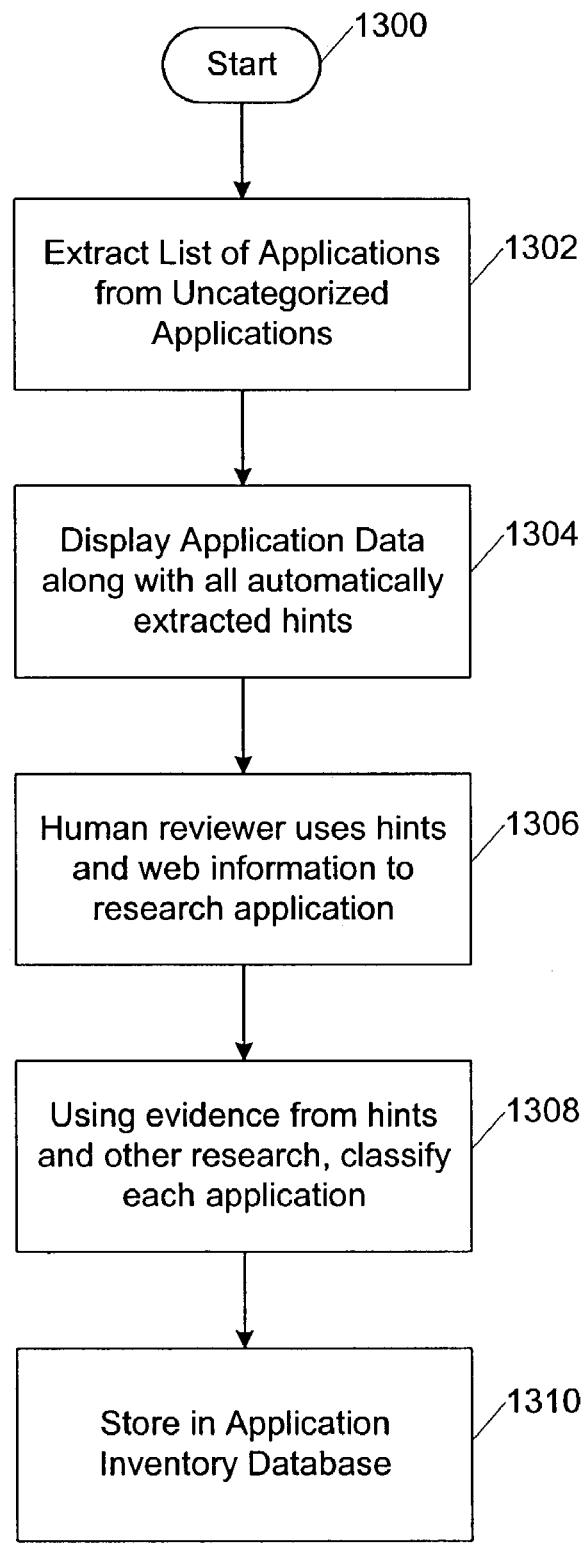
FIG. 13 is a flow diagram illustrating a process for classifying an uncategorized application at the application database factory.

Once categorized, the application analyst classification module 302 posts the application along with its associated one or more categories into the master application database 300 of applications. The master application database of applications can include applications and their associated categories. The master application database 300 can be stored in a relational database management system, such as Oracle, Sybase, Informix, Microsoft Server, and Access. A text object posting system can perform this posting. A more detailed block diagram of the process performed via the application analyst's classification module 302 is shown in FIG. 13.

Once the application analyst classification module 302 has posted the application and its associated category or categories into the master application database 300, the upload/download module 301 thereafter routinely copies the master application database 300 to the application server module(s) 102. As can be imagined, the system can include thousands of application server modules 102, each of which is updated regularly by the upload/download module 301 to provide an updated database of categorized applications. Moreover, the upload/download module 301 can transfer portions of the master application database 300, such as updates, to the application server module 102 so that the entire database does not need to be transmitted. A flowchart of the process performed by the application database factory 110 is shown in, and will be described with reference to, FIG. 11.

In some embodiments, the application analyst classification module 302 can process the categorized applications selected from the master application database 300 for their subsequent download to the application server module 102.

Figure 6:
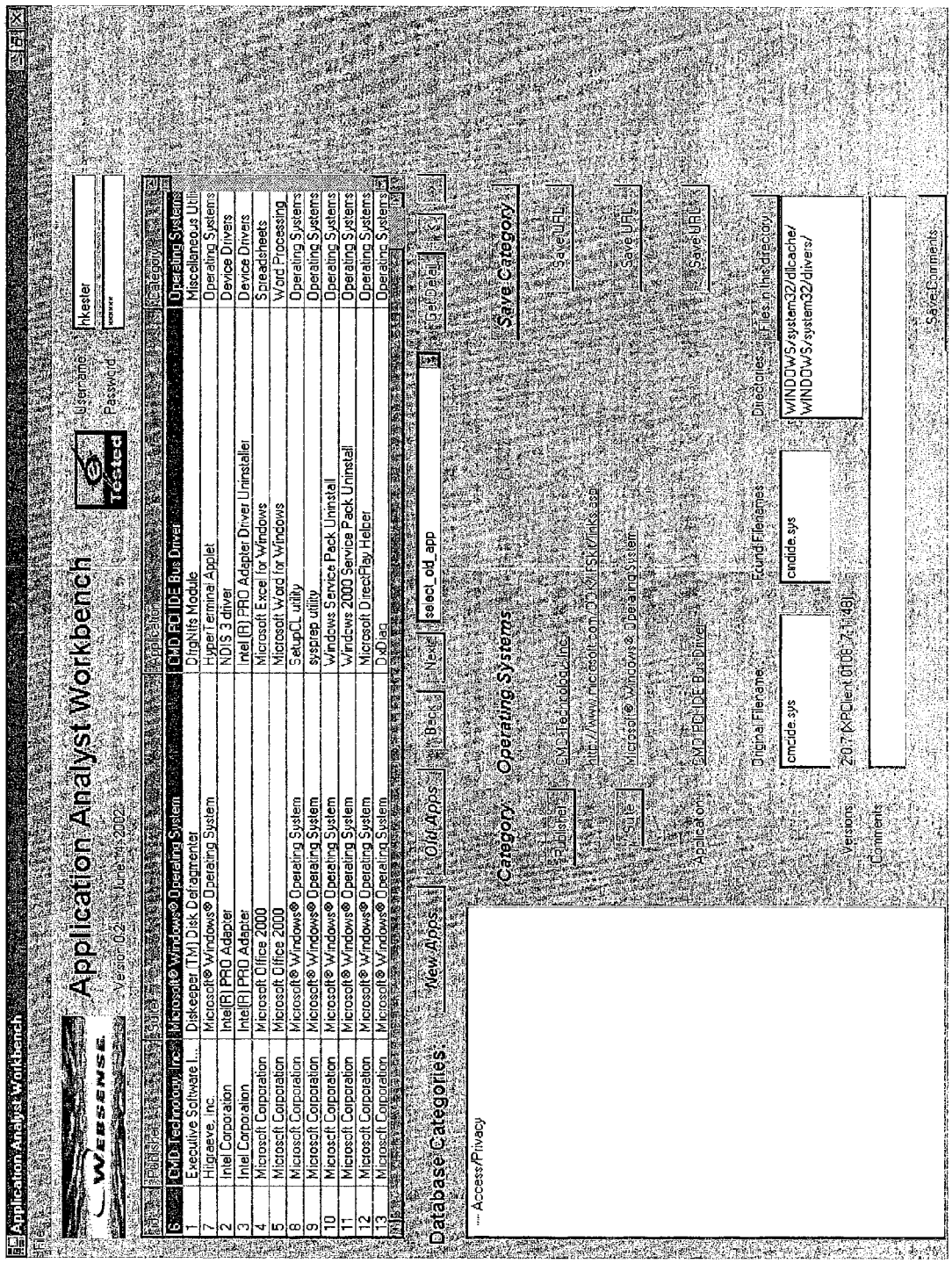
FIG. 6 is an illustration of a screen shot of one embodiment of a graphical user interface (GUI) for an application analyst's classification module.

Referring now to FIGS. 5 and 6, a screen shot of one embodiment of a graphical user interface for the application analyst's classification module 302 is shown. In FIG. 6, the highlighted application filename is "cmdide.sys." The name of the application is "CMD PCI IDE Bus Driver." In this example, additional information uploaded to the application database factory 110 includes the publisher CMD Technology, Inc. and the related suite, Microsoft Windows Operating System. The application analyst's classification module 302 displays this information to the human reviewer to aid in categorizing the application.

As shown in FIG. 6, the application, CMD PCI IDE bus driver, was associated with the URL "http://www.microsoft.com//ddk/ifskit/links.asp". In this example, the application analyst's classification module 302 classified the application in the parent group titled access/privacy. The application analyst classification module 302 can perform further categorization of the application. For example, in the parent group titled access/privacy, the application could be classified under anti-virus software, authentication, encryption, firewalls, hacking, remote access, spy ware, or system audit. One or more risk classes can be used to group categories. The risk classes can be useful to the network administrator when associating rules/policies with each application. As mentioned above, one or more categories can be associated with a single application or hash value.

Figure 7:
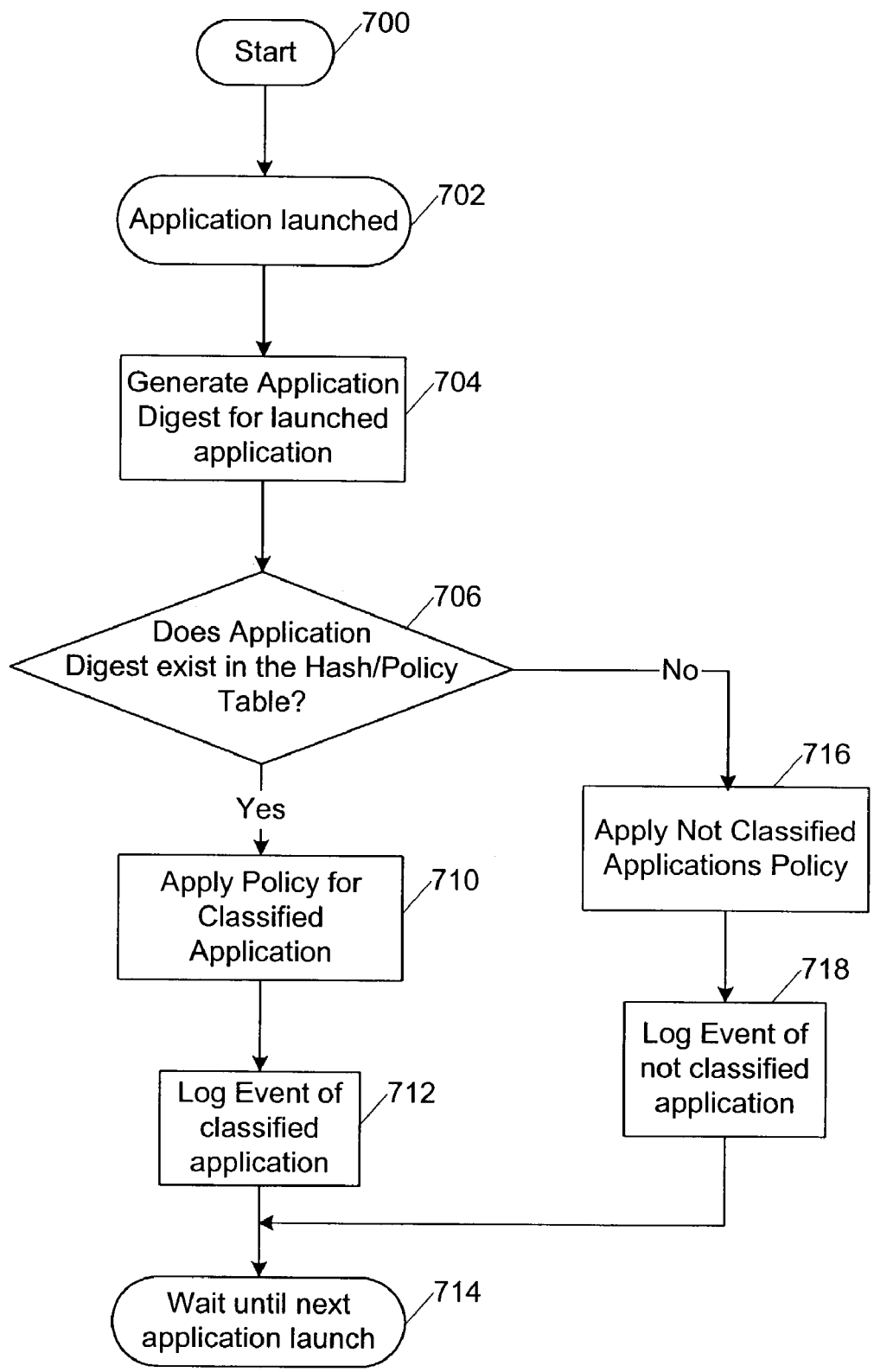
FIG. 7 is a flow diagram illustrating a process for monitoring and controlling the launch of an application on the workstation.

FIG. 7 is a flow diagram illustrating the process of monitoring and controlling the execution of a requested application on the workstation 101. The process begins at a start state 700. Next, at a state 702, the user of the workstation 101 launches an application. The launched application can be in response to a predetermined startup sequence for the workstation 101. For example, the workstation 101 could be programmed to launch one or more applications upon power-on startup. The execution launch detection module 210 (see FIG. 2) detects the launch of the application. Next, at a state 704, the application digest generator 201 generates a digest of data relating to the launched application. The digested data can be in the form of collection data. The collection data can include, for example, the publisher, suite, one or more hashes, and source directory.

The process moves to a decision state 706 where the execution launch detection module 210 compares the application digest prepared by the application digest generator 201 to the hash/policy table 204. For example, a hash generated by the application digest generator 201 can be compared to hashes from the hash/policy table 204. In one embodiment, a plurality of different hashes is generated and compared to hashes from the hash/policy table 204. For example, an MD-5 hash and an SHA-1 hash could be generated for the requested application and compared to MD-5 hashes and SHA-1 hashes from the hash/policy table 204.

If the hash corresponds to a hash stored in the hash/policy table 204, the process continues to a state 710 where the policy associated with the hash is applied in response to the launch of the requested application. For example, these policies can include allowing the execution of the application, denying execution of the application, alerting the user that the execution of the application may receive further scrutiny by the network administrator, or allow for a certain amount of time for running the application. In this instance, at the end of the specified time, the execution launch detection module 210 does not permit the application to continue running on the workstation 101. Next, at a state 712, the execution launch detection module 210 logs the event to the logging database 206. In this way, a record is maintained of the applications that are allowed to execute on the workstation 101. The process then moves to a state 714 where the execution launch detection module 210 monitors the system in order to detect the launch of another application on the workstation 101.

The retrieved information from the hash/policy table 204 further includes a policy associated with the hash value. In one embodiment, category information, which corresponds to the hash value, is utilized in selecting the policy. For example, a hash value could be associated with a parent group and/or category. The parent group and/or category could then be associated with the policy.

Returning to the decision state 706, if the application digest does not correspond with an application or hash classified in the hash/policy table 204, flow moves to a state 716 where the execution launch detection module 210 applies a not-classified application policy to the request to execute the application. The not-classified application policy can include, for example, allowing the application to execute, denying execution, or alerting the user that additional scrutiny will be applied to the requesting of the application, while limiting the amount of time that the application is allowed to run on the workstation 101.

Flow moves to a state 718 where the request to execute the application is logged to the logging database 206. The process continues to state 714 as described above where the execution launch detection module 210 awaits the launch of another application on the workstation 101.

Figure 8:
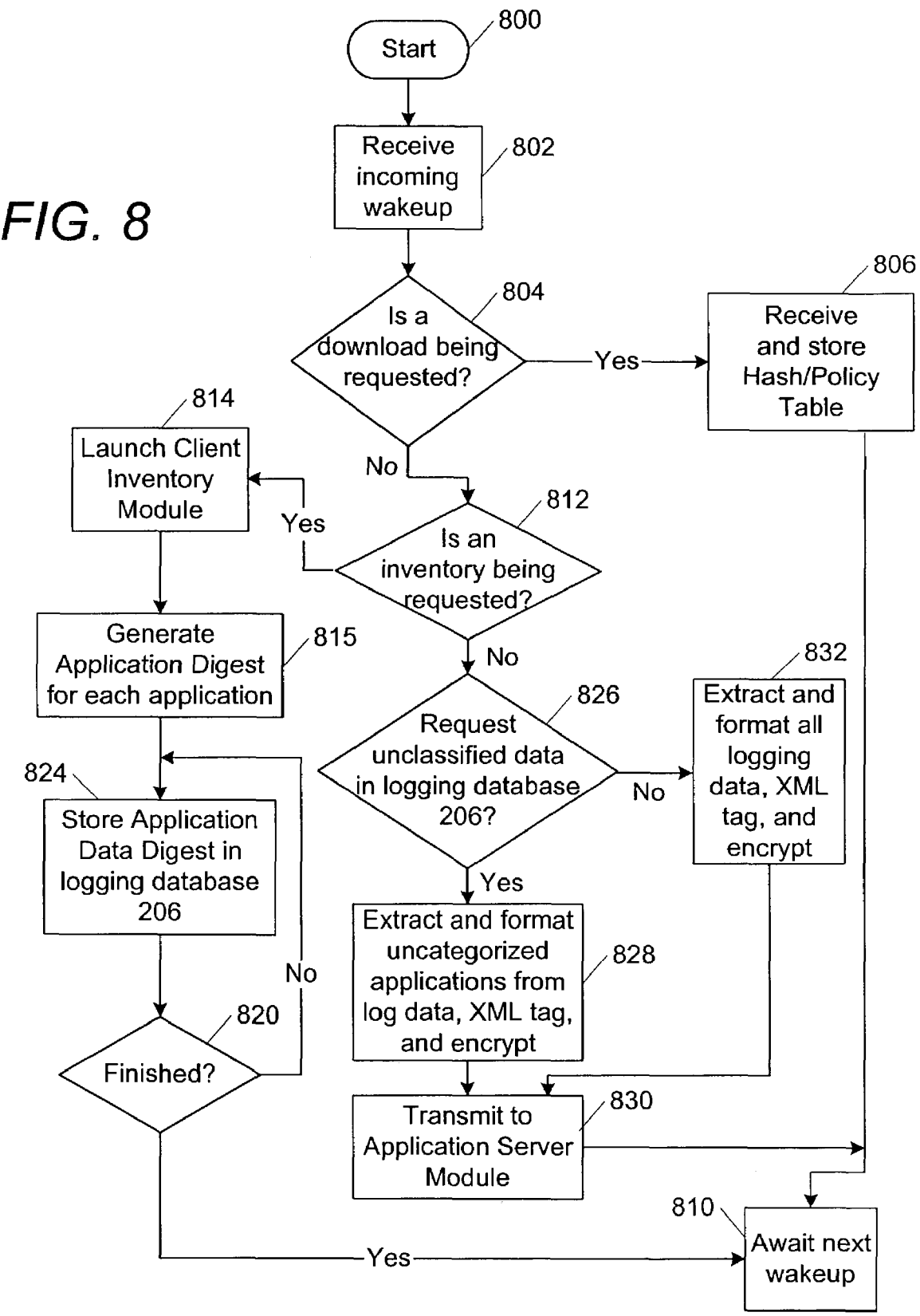
FIG. 8 is a flow diagram illustrating a process performed by the workstation for uploading and downloading collection data with the application server module.

FIG. 8 is a flow diagram illustrating a process performed by the workstation 101 for uploading and downloading collection data with the application server module 102. The process begins at a start state 800. Next, at a state 802, the upload/download module 203 receives an incoming signal from the workstation upload/download module 104. The process proceeds to a decision state 804 where the upload/download module 203 receives a request to download the hash/policy table 204 from the application server module 102. The time for receiving the download file can be periodic, random, added set time, or in response to polling. The upload/download module 203 and/or the workstation upload/download module 104 can initiate the download to the workstation management module 200.

If it is determined in state 804 that the upload/download module 203 is receiving a request to download from the application server module 102, the process moves to a state 806 where the upload/download module 203 receives and stores the hash/policy table 204 or a portion thereof.

For example, the application server module 102 can select data from the application inventory database 103 and policies from the policy database 109 for copying to the hash/policy table 204. The application inventory database 103 can include applications that have been categorized by the application database factory 110 as well as applications that have been categorized via the classification user interface 106. In some embodiments, the workstation upload/download module 104 transfers a portion of the hash/policy table 204. For example, the upload/download module 203 can receive an update so that the entire database need not be transmitted. In other embodiments, the upload/download module 203 receives a subset of the data from the application inventory database 103. For example, the selected data could be the hash values which are combined with the policies.

The downloaded data can update the existing hash/policy table 204. The downloaded data can be in the form of collection data from one or more sources. The sources can include the classification user interface 106 and the application database factory 110. As explained above, the collection data can include any additional data associated with the applications, for example, request frequencies associated with the applications from the application inventory database and/or request frequencies associated with the applications from the uncategorized application database 108, and/or indicators. The process moves to a state 810 where the upload/download module 203 awaits a wake-up signal from the application server module 102.

Returning to the decision state 804, if the upload/download module 203 is not requesting a download from the application server module 102, the process moves to a decision state 812 where the application server module 102 can request an inventory of the applications on the workstation 101. If the application server module 102 requests an inventory of the applications on the workstation 101, the process moves to a state 814 where the client inventory module 202 inventories the applications on the workstation 101. Once the client inventory module 202 compiles a list of the applications on the workstation 101, the process moves to a state 815 where the application digest generator 201 generates a digest of data relating to each application. The application digest generator 201 parses properties from the applications. Examples of such properties include the name, publisher, suite, hash, and version, which are associated with the applications.

The process then moves to a state 824 where the application and the digest are stored in the logging database 206. The process then moves to decision state 820 where the client inventory module 202 determines whether all of the inventoried applications have been stored in the logging database 206. If all of the inventoried applications have not been processed, flow returns to state 824 where the next application inventoried by the client inventory module 202 is processed as described above.

Returning to decision state 820, if all of the applications have been processed, the process moves to state 810 where the upload/download module 203 awaits a wake-up signal from the application server module 102.

Returning to decision state 812, if an inventory is not requested by the application server module 102, the process moves to a decision state 826 to determine whether the application server module 102 is only requesting collection data from the logging database 206 for uncategorized applications. If the application server module 102 only requests data for uncategorized applications, the process moves to a state 828 wherein the upload/download module 203 extracts and formats data associated with the uncategorized applications from the logging database 206 for uploading to the application server module 102. The process next moves to a state 830 where the data associated with the uncategorized applications is transmitted to the application server module 102. The collection data uploaded to the application server module 102 can be formatted or unformatted. Additionally, the collection data can be encrypted and/or compressed or not. The workstation upload/download module 104 decrypts and uncompresses the collection data if decryption and/or uncompression is required. The workstation upload/download module 104 reassembles the collection data into a list of applications and any additional data associated with the applications. The workstation upload/download module 104 merges and sorts the collection data.

Next, the process moves to the state 810 where the workstation management module 200 awaits the next wake-up signal from the application server module 102.

Returning to the decision state 826, if the application server module 102 is not requesting only the collection data for the uncategorized applications from the logging database 206, the process moves to a state 832 where the upload/download module 203 extracts and formats all of the application data in the logging database 206. This data can include categorized data for applications that are listed in the hash/policy table 204 and uncategorized data for applications that are not listed in the hash/policy table 204. The collection data can be formatted or unformatted. Additionally, the collection data can be encrypted and/or compressed or not. Flow then proceeds to state 830 where the data from the logging database 206 is uploaded to the application server module 102. The flow then proceeds as described above to state 810 where the workstation management module 200 awaits a wake-up signal from the application server module 102.

Figure 9:
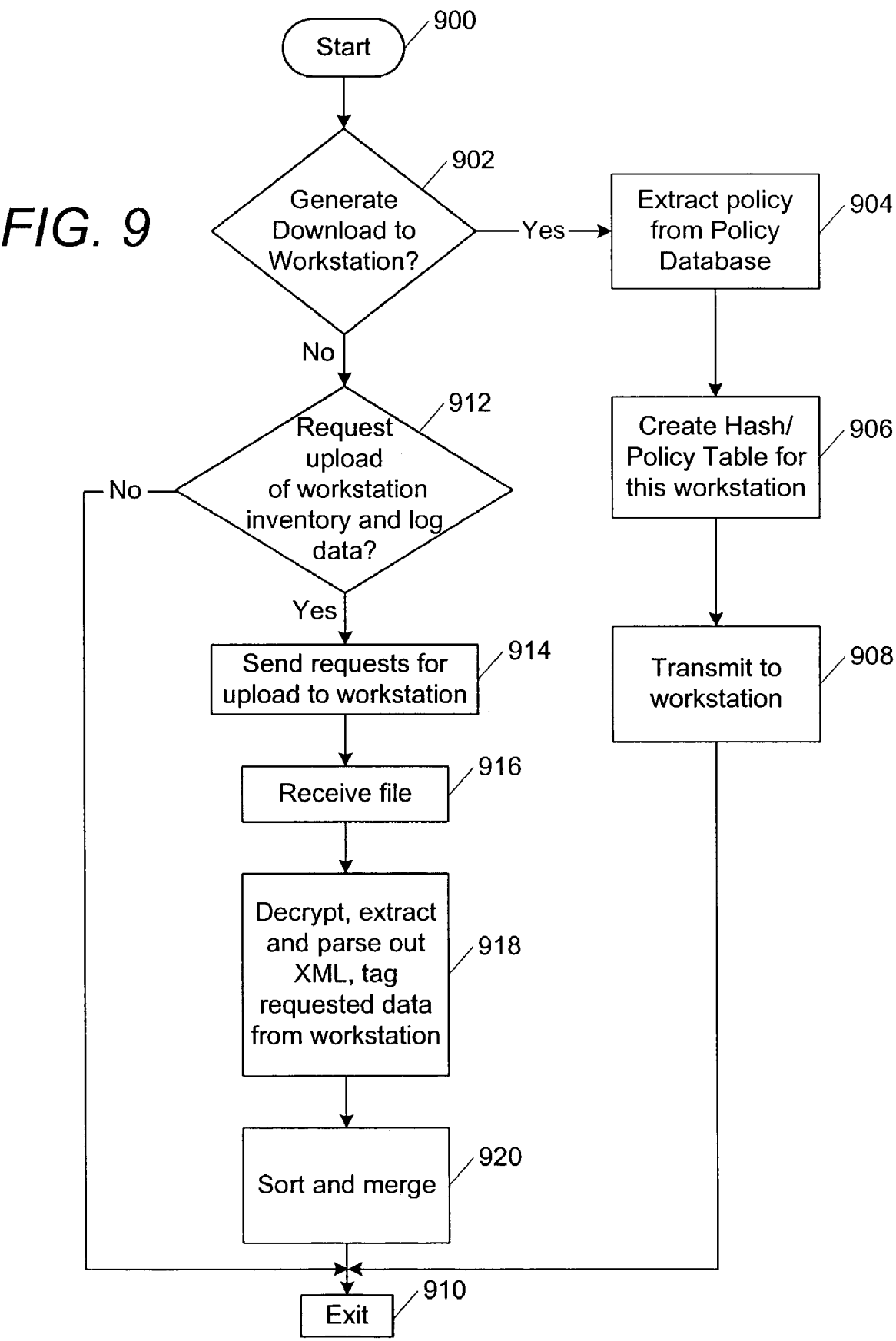
FIG. 9 is a flow diagram illustrating a process performed by the application server module for uploading and downloading collection data with the workstation.

FIG. 9 is a flow diagram illustrating a process performed by the application server module 102 for uploading and downloading collection data with the workstation 101. The process begins at a start state 900. Next, at a decision state 902, the workstation upload/download module 104 determines whether to generate a download to the workstation management module 200. The time for receiving the download can be periodic, random, at a set time, or in response to polling. The workstation upload/download module 104 and/or the upload/download module 203 can initiate the download to the workstation management module 200. If the workstation upload/download module 104 is to download to the workstation management module 200, the process moves to a state 904 where the workstation upload/download module 104 extracts policy data from the policy database 109. The policy database 109 associates access permissions to the parent groups and/or categories associated with each application based on the workstation receiving the download. For example, if a workstation were not designated to run applications relating to games, the policy database 109 would identify the parent groups/or categories which are associated with games for that workstation. The network administrator, via the classification user interface 106, can update the policy database 109. The policy database 109 can include different access privileges for each workstation 101. In this way, different workstations 101 can have different policies associated with the applications running thereon.

The process moves to a state 906 where the workstation upload/download module 104 creates a hash/policy table from the application inventory database 103 in conjunction with the designated policies for this workstation. Each parent group and/or category is associated with the policies extracted from the policy database 109 for each of the one or more workstations receiving a download. Each application or hash in the application inventory database 103 can be associated with a parent group and/or category. Continuing with the example above, the workstation upload/download module 104 selects the hash values from the application inventory database 103 for applications that are associated with the parent group/or categories relating to games. Thus, the same application may be allowed to run on a workstation but not allowed to run on a different workstation. Flow continues to a state 908 where the workstation upload/download module 104 transmits the hash/policy table 204 or a portion thereof to the upload/download module 203. The download file can include the application names, hash values, associated categories, and/or associated policies. Flow then proceeds to end state 910.

Returning to decision state 902, if the workstation upload/download module 104 is not generating a download for the workstation 101, the process moves to a decision state 912 where the workstation upload/download module 104 determines whether to request an upload of the workstation inventory. The workstation inventory can include all, or a portion of, the logging database 206.

If the workstation upload/download module 104 requests an upload from the workstation 101, the process moves to a state 914 where a request is sent by the application server module 102 to the upload/download module 203. Next, at a state 916, the workstation upload/download module 104 receives the requested upload from the workstation 101. The uploaded data can be formatted or unformatted. Additionally, the uploaded data can be encrypted and/or compressed or not. The workstation upload/download module 104 decrypts and uncompresses the uploaded data if decryption and/or uncompression is required at next state 918.

Flow continues to state 920 where the workstation upload/download module 104 reassembles the uploaded data into a list of applications and any additional data associated with the applications. The workstation upload/download module 104 merges and sorts the collected data including the frequency count with other workstation inventories. The system can include thousands of workstation management modules, each of which is regularly uploading data from its logging database 206. As explained above, the uploaded data can include any additional data associated with the application, for example, directory location. The workstation upload/download module 104 can merge and sort the uploaded data based on the application or any additional data associated with the application. For example, the workstation upload/download module 104 can refer to a request frequency to sort and merge the applications from one or more workstations 101.

Figure 10:
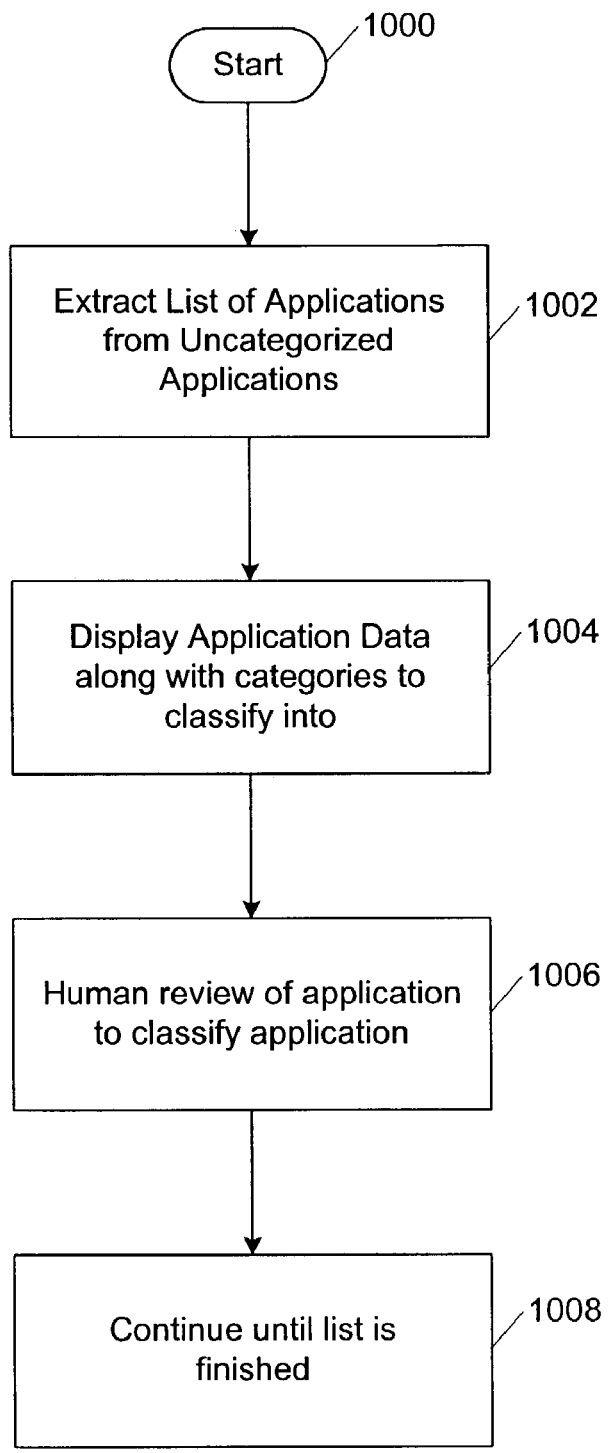
FIG. 10 is a flow diagram illustrating a process for classifying an uncategorized application at the application server module.

FIG. 10 is a flow diagram illustrating the process of categorizing the applications at the application server module 102. The process begins at a start state 1000. Next, at a state 1002, a network administrator launches the classification user interface 106 via the GUI. The GUI provides a graphical interface tool for the network administrator to manipulate and manage the application inventory database 103. The network administrator extracts a list of applications and/or associated data from the uncategorized application database 108 for review and categorization. The process moves to a state 1004 where the application and any related data is displayed for review by the network administrator. Next, at a state 1006, the network administrator classifies the application based on the displayed data. The process then moves to a state 1008 where the process returns to states 1004 and 1006 for each application extracted from the uncategorized application database 108.

Figure 11:
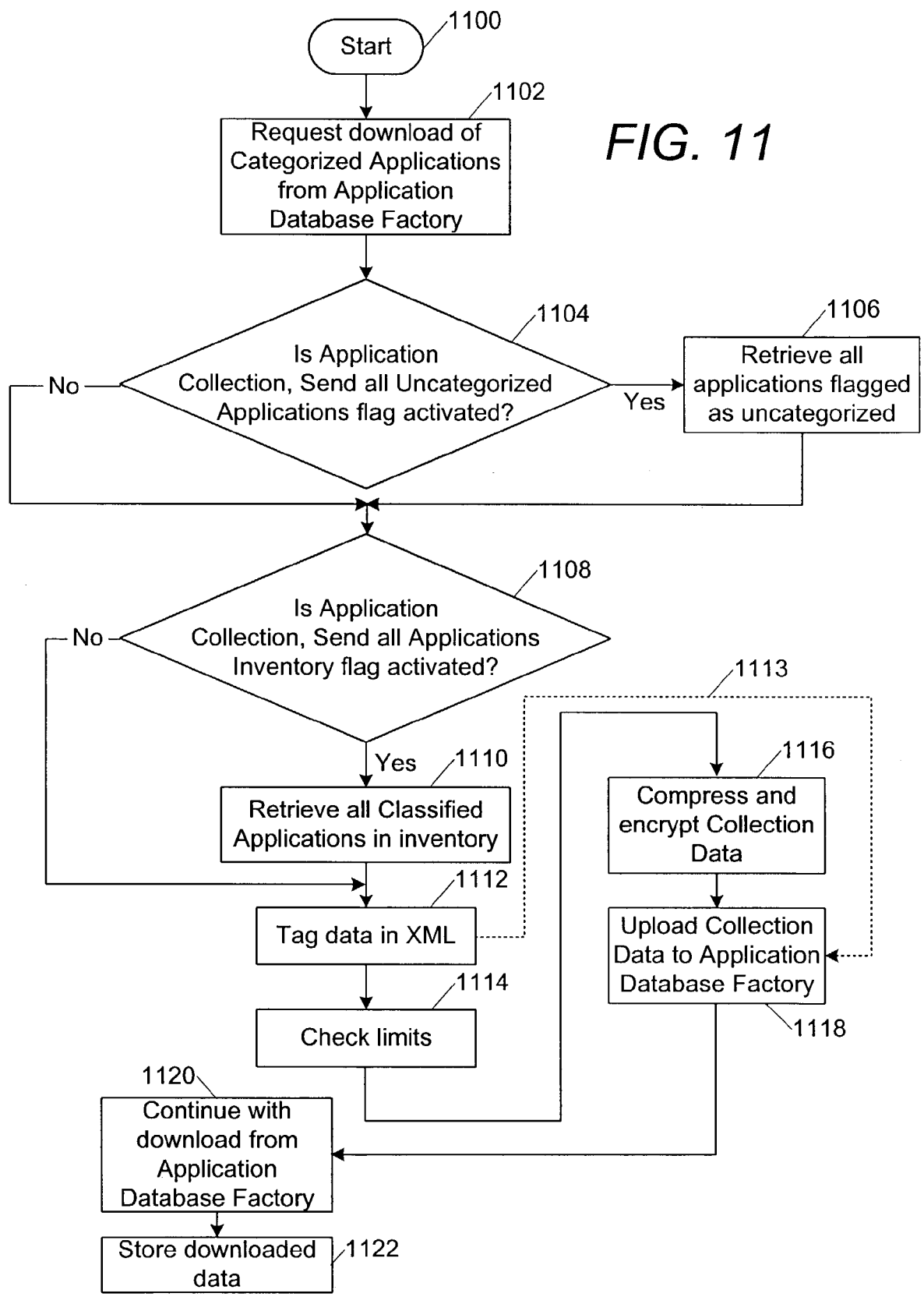
FIG. 11 is a flow diagram illustrating a process for uploading application data from the application server module to the application database factory.

FIG. 11 is a flow diagram illustrating the process of downloading the master application database 300 to the application server module 102 and for uploading inventoried application data from the application server module 102. The process begins at a start state 1100. Next, at a state 1102, the factory upload/download module 105 requests a download of the categorized applications from the application database factory 110. The categorized applications are stored in the master application database 300 at the application database factory 110. The time for receiving the categorized applications can be periodic, random, at a set time, or in response to polling. The factory upload/download module 105 and/or the upload/download module 301 can initiate the download to the application server module 102. As explained above, the downloaded data can include any additional data associated with the application.

Flow continues to decision state 1104 where the factory upload/download module 105 (see FIG. 3) determines whether a send all uncategorized application flag has been activated. The send all uncategorized application flag can be selected by the network administrator via the classification user interface 106. If the send all uncategorized application flag has been activated, the process moves to a state 1106 where the factory upload/download module 105 retrieves all applications from the uncategorized application database 108. Flow continues to decision state 1108 where the factory upload/download module 105 determines if the send all application inventory flag has been activated. The send all application inventory flag can be activated by the network administrator via the classification user interface 106. If the send all application inventory flag has been activate, the process moves to a state 1110 where the factory upload/download module 105 retrieves the data from the application inventory database 103. Flow moves to a state 1112 where the uncategorized applications and any additional data associated with the applications, for example, collection data, can be formatted. The additional data can include request frequencies and/or indicators associated with the applications. The collection data is not required to be formatted and thus may be directly uploaded to the application database factory 110. Moreover, the selection of a format for the collection data can depend on the type of data connection that the application database factory 110 has with the application server module 102. For a data connection via the Internet 108, the factory upload/download module 105 can use a markup language, for example, extensible markup language (XML), standard generalized markup language (SGML), and hypertext markup language (HTML), to format the collection data.

The collection data can be further processed prior to its upload to the application database factory 110. For example, check limit state 1114 and compression and encryption state 1116 can be performed to process the collection data prior to uploading to the application database factory 110. While these blocks may facilitate the upload of the collection data, they are not required to be performed. The collection data can be uploaded without applying states 1114 and 1116. In this way the process can follow alternate path 1113. Thus, the collection data can be directly uploaded to the application database factory 110 without applying states 1114 and 1116.

If further processing is desired, the process moves to a state 1114 where the factory upload/download module 105 can limit the collection data to a maximum size for uploading to the application database factory 110. For example, the collection data from a single workstation could be limited to a maximum of 20 megabytes. The process continues to a state 1116 where the collection data is compressed so that the collection data takes up less space. Further, the collection data is encrypted so that it is unreadable except by authorized users, for example, the application database factory 110.

Flow continues to a state 1118 where the collection data is uploaded to the application database factory 110. As explained above, the collection data can include any additional data associated with the application, for example, suite information. The process moves to a state 1120 where the upload/download module 301 continues with the download to the factory upload/download module 105. The process moves to a state 1122 where the downloaded data is stored in the application inventory database 103.

Returning to decision state 1108, if the send all application inventory flag is not activated, flow moves to state 1112 as described above. Since the send all application inventory flag was not activated, the factory upload/download module 105 formats the data retrieved at state 1106 for its upload to the application database factory 110 as described with reference to states 1112, 1114, 1116 and 1118.

Returning to decision state 1104, if the send all uncategorized application flag was not activated, the process moves to decision state 1108 as described above where the factory upload/download module 105 determines if the send all application inventory flag has been activated. Depending on whether the send all application inventory flag was activated, the process then continues as described above.

Figure 12:
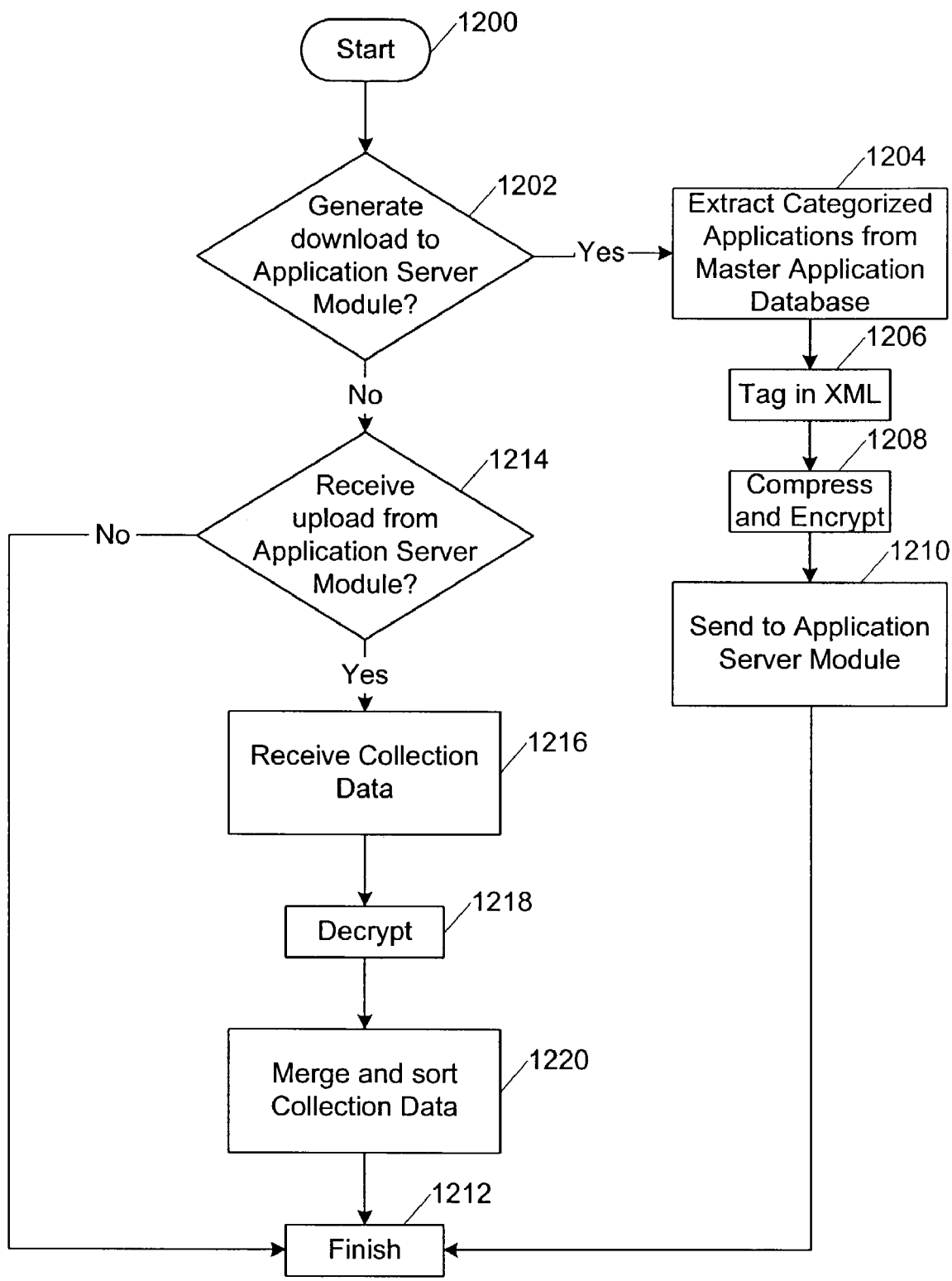
FIG. 12 is a flow diagram illustrating a process for downloading application data from the application database factory to the application server module.

FIG. 12 is a flow diagram illustrating processing of collecting data by the application database factory 110. The process begins at a state 1200. Next, at a decision state 1202, the application database factory 110 can download the master application database 300 to the application server module 102. If the application database factory 110 is to download the master application database 300 to the application server module 102, the process moves to a state 1204 where the upload/download module 301 extracts categorized applications from the master application database 300. A subset of the categorized applications can be selected for download to the application server module 102. The subset can include only categorized applications that have been deemed ready for publishing.

The process moves to a state 1206 where the application data retrieved from the master application database 300 can be formatted. The application data is not required to be formatted and this may be directly downloaded to the application server module 102. Moreover, the selection of a format for the data can depend on the type of data connection that the application database factory 110 has with the application server module 102. For a data connection via the Internet 108, the upload/download module 301 can use a markup language, for example, XML, SGML and HTML, to format the collection data.

The data to be downloaded can be further processed prior to its download to the application server module 102. The process continues to a state 1208 where the application data is compressed so that the application data takes up less space. Further, the application data is encrypted so that it is unreadable except by authorized users, for example, the application server module 102. Flow continues to a state 1210 where the application data is downloaded to the application server module 102. The process then moves to state 1212 which is an end state.

Returning to decision state 1202, if application data from the master application database 300 is not being downloaded to the application server module 102, the process moves to a decision state 1214 where the application database factory 110 can receive an upload from the application server module 102. If the application database factory 110 is not to receive an upload from the application server module 102, the process moves to end state 1212.

Returning to decision state 1214, if the application database factory 110 is to receive an upload from the application server module 102, the process moves to a state 1216 where the upload/download module 301 receives the upload from the factory upload/download module 105. The time for receiving the collection data can be periodic, random, at a set time, or in response to polling. The upload/download module 301 and/or the factory upload/download module 105 can initiate the upload to the application database factory 110. As explained above, the collection can include any additional data associated with the application, for example, request frequencies associated with the application from the application inventory database 103 and/or request frequencies associated with applications from the uncategorized application database 108. The collection data can be formatted or unformatted. Additionally, the collection data can be encrypted and/or compressed or not.

The process continues to a state 1218 where the upload/download module 301 decrypts and uncompresses the collection data if decryption and/or uncompression is required. The process moves to a state 1220 where the collection data is merged and sorted into the master application database 300 and the uncategorized application database 303. The process then continues to end state 1212.

FIG. 13 is a flowchart illustrating the process of classifying applications from the uncategorized application database 303. The process begins at start state 1300. The process moves to a state 1302 where a list of applications is extracted from the uncategorized application database 303 for classification by the human reviewer via the application analyst's classification module 302. The application analyst classification module 302 interfaces with the human reviewer to determine the appropriate category or categories of the application. Next, at a state 1304, the application analyst's classification module 302 is utilized to display the application and any related data on the GUI. The related data can indicate to the human reviewer the category or categories with which the application should be associated. As explained above, the application analyst classification module 302 allows the human reviewer to analyze each application and any additional data that is associated with the application to determine its appropriate category or categories.

The process continues to a state 1306 where the human reviewer uses the application, related information, and any Internet information to research the application. The Internet information can be derived from a search using a web browser search engine. The application name and any of the related application data can be used for the Internet search. The human reviewer can further review documents, specifications, manuals, and the like to best determine the category or categories to associate with the application. The process continues to a state 1308 where the human reviewer classifies each application using the evidence associated with the application, any hints from the related information, and/or other research.

The process finally moves to a state 1310 where the selected category or categories that the human reviewer associated with the given application is stored in the master application database 300.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system for collecting program data for use in updating a monitoring system which controls programs operating on a workstation, comprising:
    a workstation having a first database of information identifying categorized programs with one or more categories and one or more policies, the workstation being configured for a user to request execution of a program;
    an application server module having a second database of information identifying categorized programs with one or more categories and one or more policies;
    a workstation management module coupled to the workstation and configured to;
        detect the program execution request;
        determine whether the requested program is identified in the first database;
        if the requested program is not identified in the first database, send identification information for the requested program to the application server module; and
        if the requested program is identified in the first database, apply one or more policies that are associated with the requested program;
    wherein the application server module is configured to;
        receive the identification information for the requested program from the workstation management module if the requested program was not identified in the first database at the workstation;
        determine whether the requested program is identified in the second database;
        if the requested program is not identified in the second server, send information identifying the requested program to a categorization server configured to categorize the requested program; and
        if the requested program is identified in the second server, provide any policies associated with the one or more categories that are associated with the requested program to the workstation management module.

2. The system of claim 1 wherein the categorization server is configured to:
    receive the information identifying the requested program from the application server module;
    determine whether the requested program was previously categorized by the categorization server;
    if the requested program was not previously categorized by the categorization server, determine the one or more categories to associate with the requested program and provide the one or more categories to the application server module; and
    if the requested program was previously categorized by the categorization server, provide the one or more categories that were previously associated with the requested program to the application server module.

3. The system of claim 2, wherein the first database of categorized programs includes hash values.

4. The system of claim 3, wherein the requested program is in the first database of categorized programs and is associated with the one or more policies.

5. The system of claim 2, wherein the application server module is further configured to analyze program data associated with the requested program for a data characteristic that is indicative of the one or more categories, and to associate one or more indicators with the requested program.

6. The system of claim 5, wherein analyzing the program data is performed on text strings that are associated with the requested program.

7. The system of claim 5, wherein the one or more indicators includes a category flag.

8. The system of claim 7, wherein the application server module uses the one or more indicators to screen the requested program prior to sending the identification information for the requested program to the categorization server.

9. The system of claim 2, wherein the workstation management module comprises an application digest generator configured to determine program data to associate with the requested program.

10. The system of claim 9, wherein the program data includes a suite.

11. The system of claim 9, wherein the program data includes a publisher.

12. The system of claim 9, wherein the program data includes a source directory.

13. The system of claim 9, wherein the application server module comprises:
a classification user interface configured to provide an interface for a network administrator to select the one or more policies that are applied to the one or more categories associated with the requested program;
an uncategorized application database configured to store the identification information for the requested program and associated data if the requested program was not previously categorized; and
an upload/download manager module configured to send the stored identification information and associated data to the categorization server and to receive the one or more categories from the categorization server.

14. The system of claim 13, wherein the uncategorized application database includes a request frequency that is associated with the requested program and indicates the frequency of requests for the requested program in the uncategorized application database.

15. The system of claim 14, wherein the upload/download manager module is configured to send the request frequency from the uncategorized application database to the categorization server.

16. The system of claim 15, wherein the categorized application database includes a request frequency that is associated with the requested program and indicates the frequency of requests for the requested program in the uncategorized application database.

17. The system of claim 16, wherein the one or more policies include allowing the requested program to run on the workstation based on the one or more policies associated with the requested program and the user.

18. The system of claim 13, wherein the one or more policies include not allowing the requested program to run on the workstation based on the one or more policies associated with the requested program and the user.

19. The system of claim 2, wherein the categorization server comprises:
an upload/download module configured to receive the identification information for the requested program and data associated with the requested program from the application server module, determine whether the requested program has been previously categorized by the categorization server, and provide the one or more categories to the application server module;
an application analyst's classification module configured to categorize the requested program if not previously categorized by the categorization server; and
a master application database configured to store the identification information for the requested program and the one or more categories.

20. The system of claim 19, wherein the upload/download module is configured to receive a request frequency from the application server module to prioritize processing of the program in the categorization server.

21. The system of claim 19, further comprising:
a second workstation; and
a second application server module coupled to the second workstation and the categorization server.

22. The system of claim 19, wherein the upload/download module is further configured to merge and sort the requested program and a second program received from the second workstation.

23. A method of updating a system which controls operation of programs on a workstation, the method comprising:
receiving a request for execution of an application;
determining whether the application is categorized in a first database, wherein a categorized application is associated with one or more policies;
if the application is categorized, then applying the one or more policies that are associated with the application;
if the application is not categorized, then posting the application to a logging database;
uploading the logging database to an application server module;
determining whether the posted application is in a second database of categorized applications associated with the application server module, wherein a categorized application is associated with one or more categories;
if the posted application is not in the second database of categorized applications, then posting the application to a database of uncategorized applications; and
if the posted application is in the second database of categorized applications, then providing one or more policies associated with the posted application to the application server module.

24. The method of claim 23, further comprising:
uploading the uncategorized application database to a categorization server configured to categorize the posted application;
determining whether each application has been previously categorized by the categorization server;
for each application that was not previously categorized, categorizing each application and/or data associated with the application to select one or more categories to associated with each application;
posting each application along with its selected one or more categories into a database of categorized applications; and
downloading the database of categorized applications for incorporation into the application inventory database.

25. The method of claim 24, further comprising:
updating a request frequency in the application inventory database if the application is in the application inventory database; and
uploading the application inventory database request frequency and the associated application to the application database factory.

26. The method of claim 24, wherein the one or more policies include allowing or disallowing the application to run based on the one or more categories associated with the application and the user.

27. The method of claim 24, wherein the one or more policies include allowing the application to run on the workstation based on the one or more categories associated with the application and the user.

28. The method of claim 24, wherein the logging database further includes additional data associated with the application.

29. The method of claim 28, wherein the additional data includes a request frequency.

30. The method of claim 28, wherein the additional data includes a suite.

31. The method of claim 28, wherein the additional data includes a publisher.

32. The method of claim 28, wherein the additional data includes a source directory.

33. The method of claim 23, further comprising:
analyzing the application and/or the additional data associated with the application for data characteristics that are indicative of the one or more categories; and
associating one or more indicators with the application.

34. The method of claim 33, wherein the analyzing the program data is performed on text strings that are associated with the application and/or the additional data associated with the application.

35. The method of claim 33, wherein the one or more indicators can include a category flag.

36. The method of claim 35, further comprising screening the application using the one or more indicators prior to uploading the uncategorized application database to the application database factory.

* * * * *